May 7, 1929.  W. F. HACKETT  1,712,143
CULINARY APPLIANCE
Filed Nov. 8, 1922  5 Sheets-Sheet 1
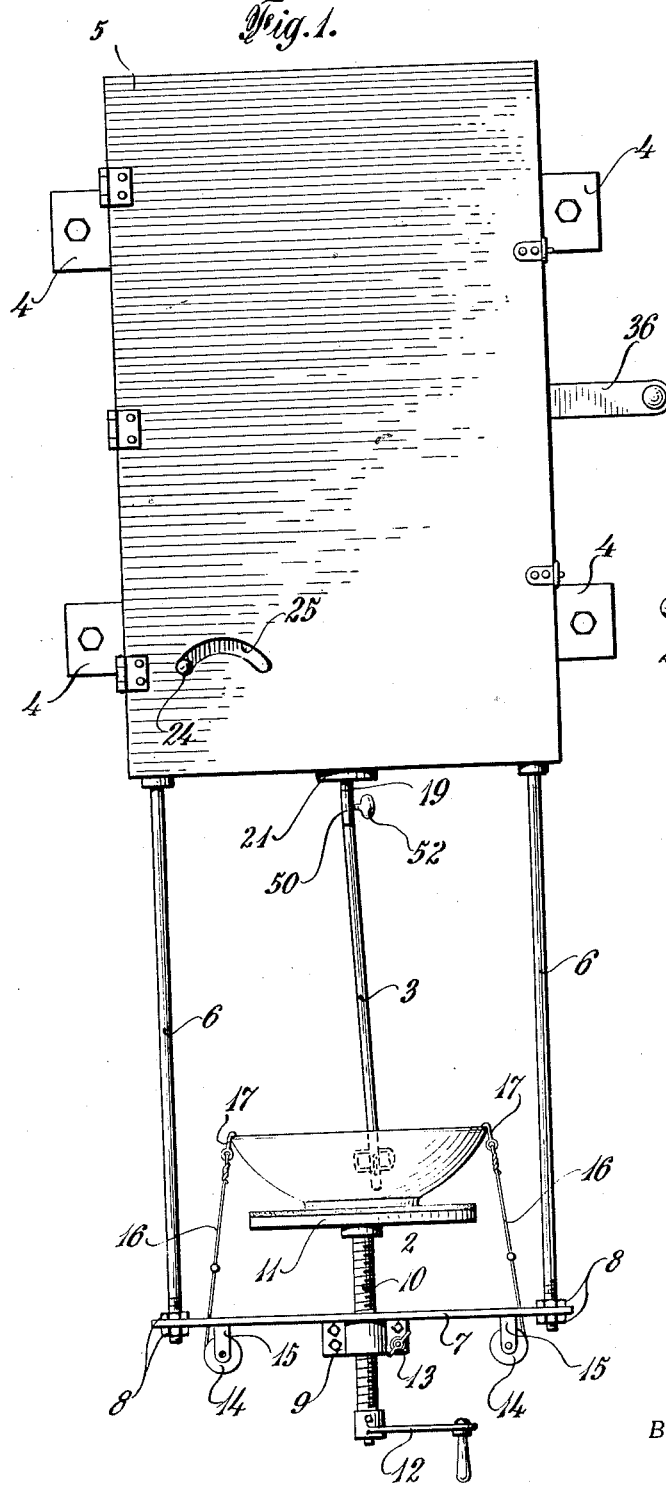
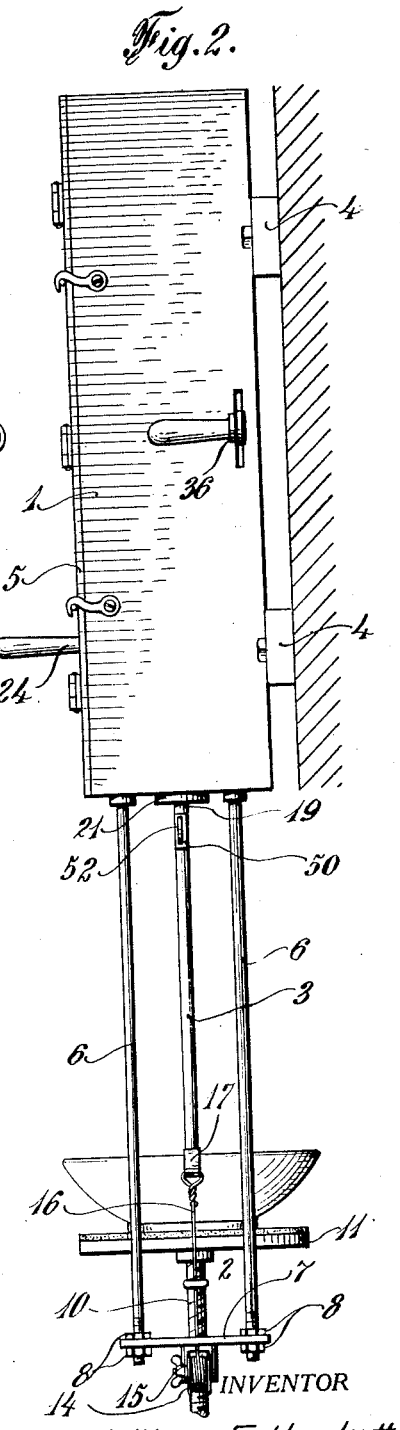
INVENTOR
William F. Hackett.
BY
Edwin B. H. Tower Jr.
ATTORNEY

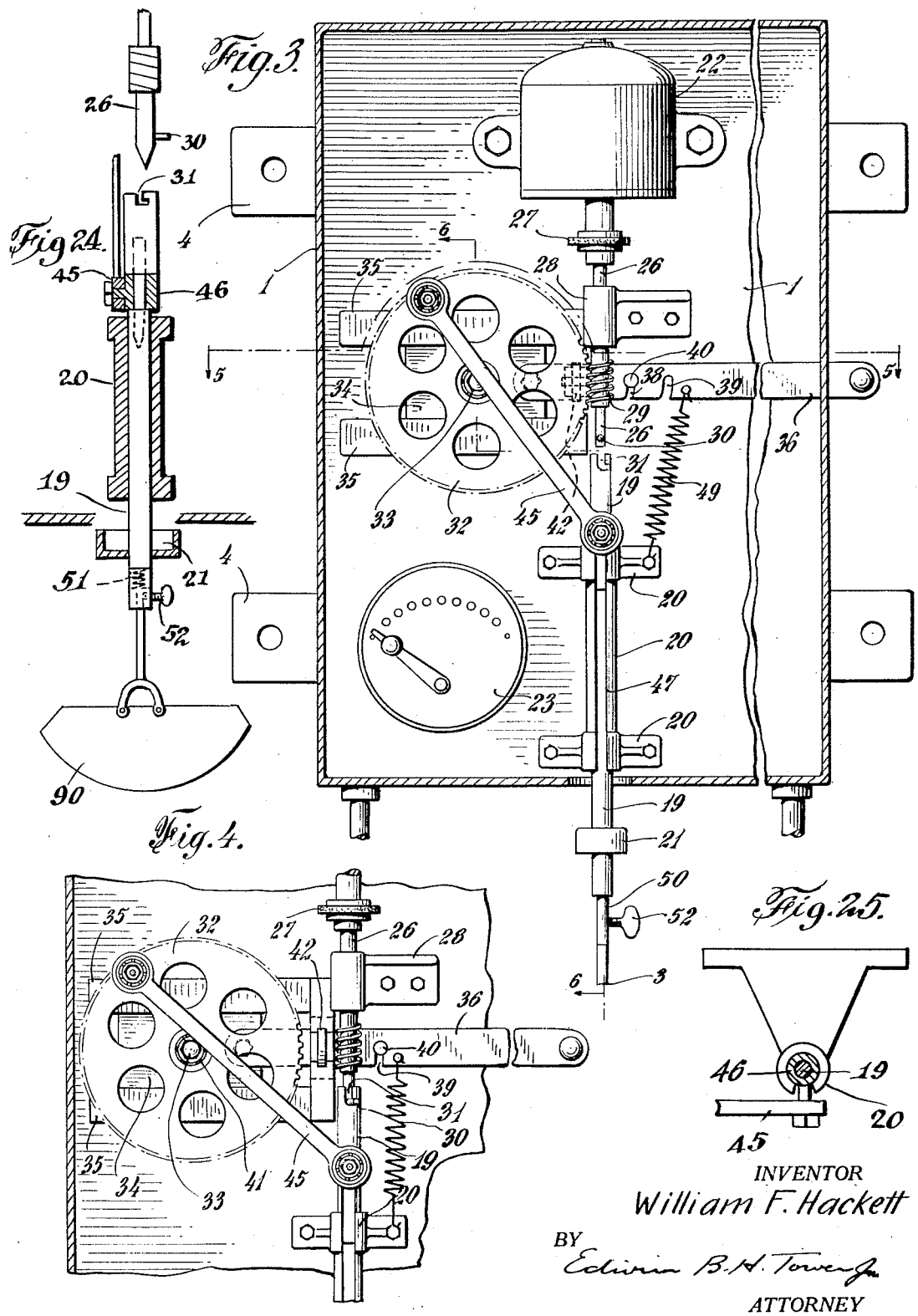

May 7, 1929.    W. F. HACKETT    1,712,143
CULINARY APPLIANCE
Filed Nov. 8, 1922    5 Sheets-Sheet 3
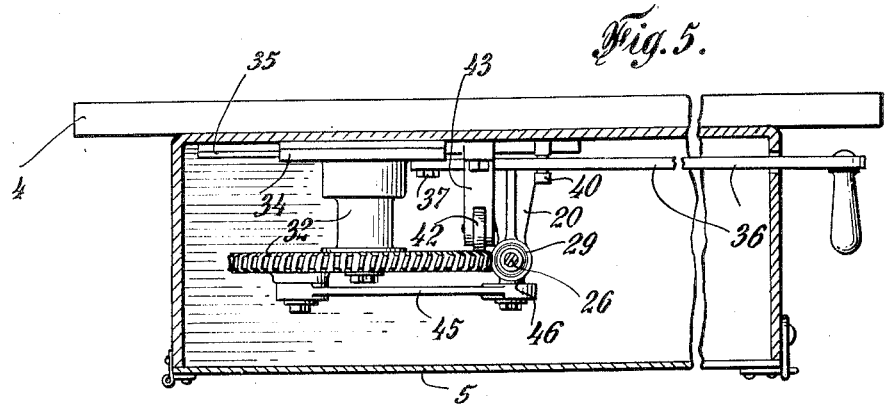
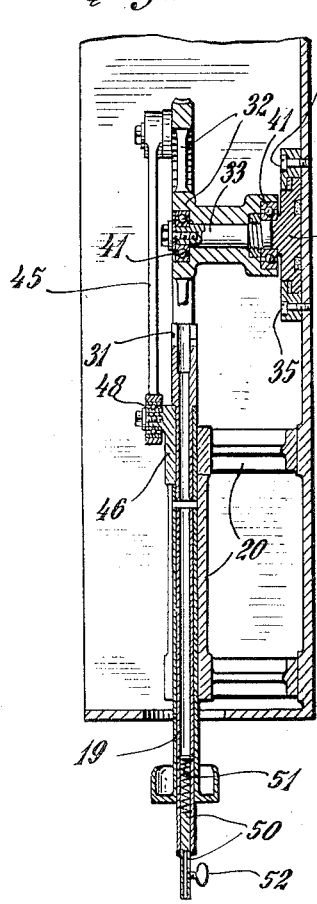
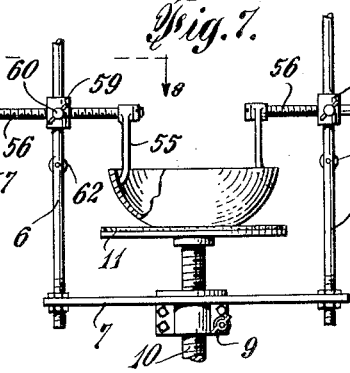
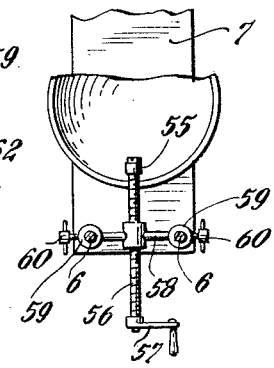
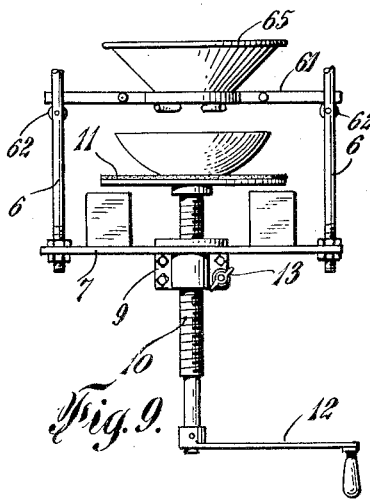
INVENTOR
William F. Hackett.
BY
Edwin B. H. Towers Jr
ATTORNEY

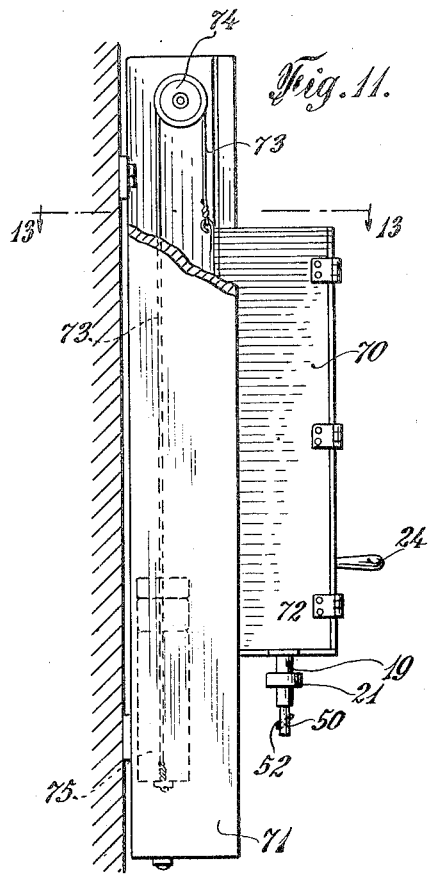
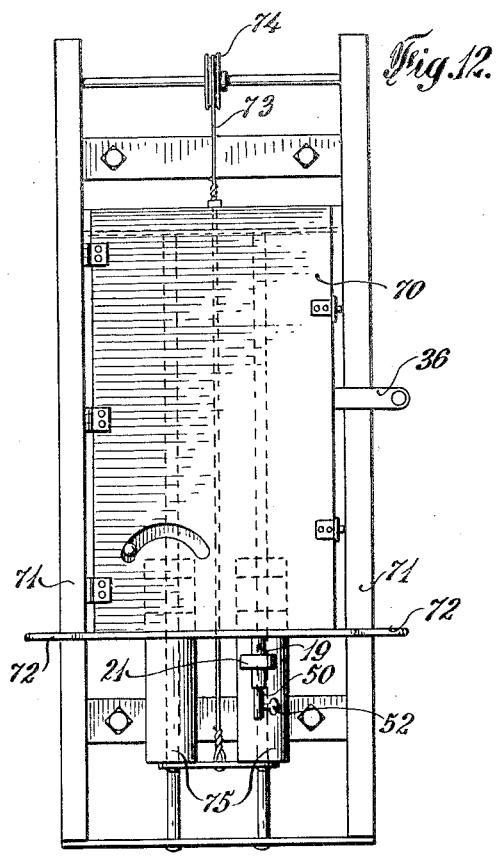
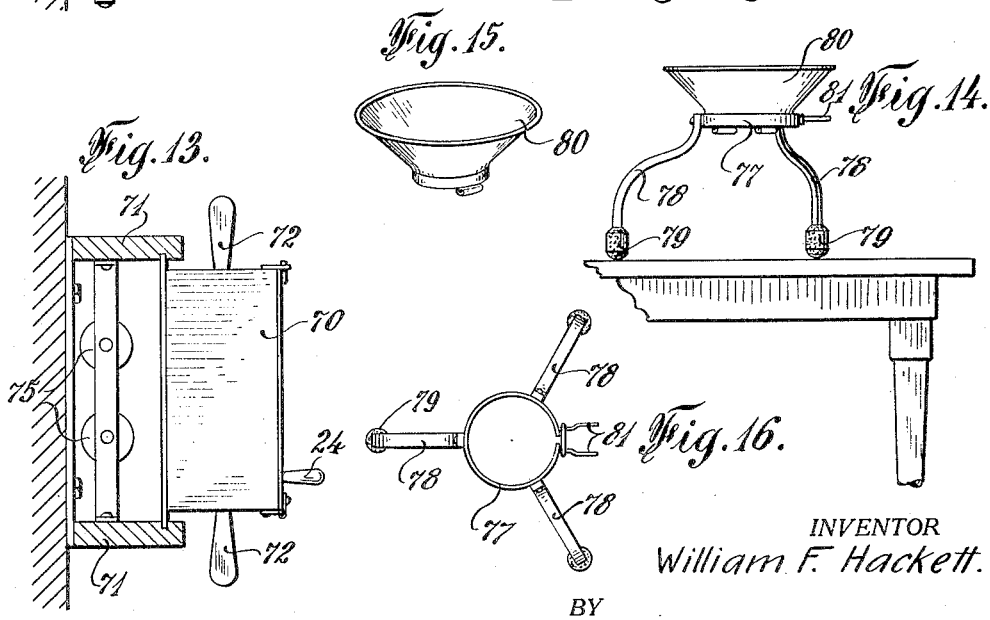

May 7, 1929. W. F. HACKETT 1,712,143
CULINARY APPLIANCE
Filed Nov. 8, 1922 5 Sheets-Sheet 5
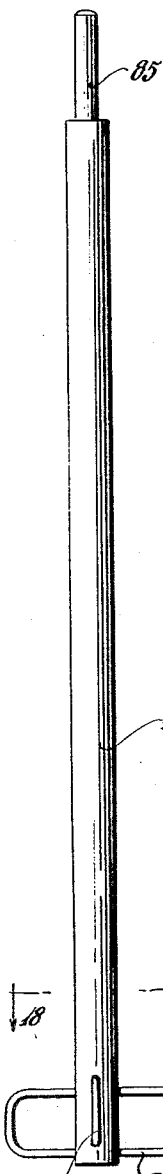
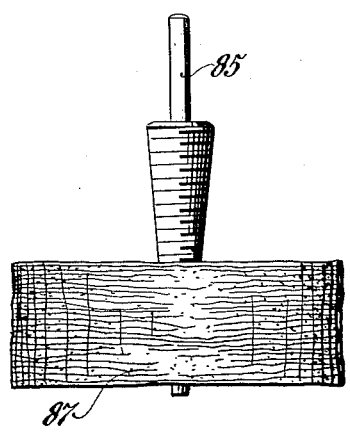
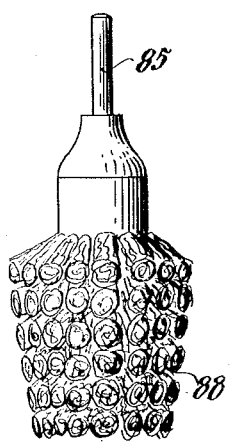
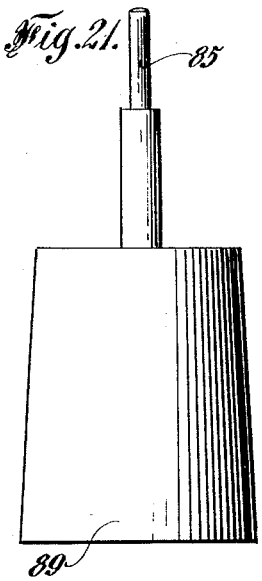
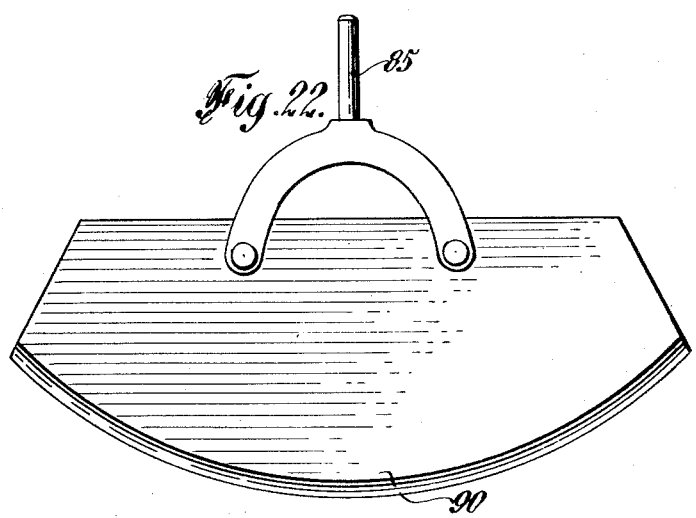
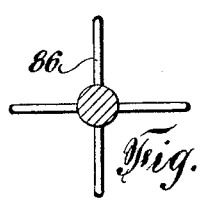
INVENTOR
William F. Hackett
BY
Edwin B. H. Tower Jr
ATTORNEY Patented May 7, 1929.

1,712,143

UNITED STATES PATENT OFFICE.

WILLIAM F. HACKETT, OF BROOKLYN, NEW YORK.

CULINARY APPLIANCE.

Application filed November 8, 1922. Serial No. 599,721.

This invention relates to culinary appliances.

It will be explained as embodied in an appliance especially adapted for kitchen use in the preparation of foods and the cleaning and polishing of culinary and other utensils.

One of the objects of the invention is to provide an appliance which will lessen the labor and time required for the preparation of foods and for the cleaning and polishing of utensils.

Another object is to provide an appliance which may be used to automatically perform such operations as the beating, stirring, mixing, crushing, mashing, chopping and grinding of food ingredients.

Another object is to provide a machine which is reliable in operation; of simple construction; and readily controlled and adapted for various duties.

Another object is to provide a machine which may be used with a wide variety of implements for performing different work.

Another object is to provide a machine which may be used with ordinary kitchen utensils in the preparation of food.

Another object is to provide a simple machine which may be employed to impart either rotary or reciprocatory movements to various culinary implements.

Another object is to provide means for effecting a selective movement of the implement, controllable entirely from the exterior of the cabinet.

Another object is to provide means so that the implement carrying shaft will be free to rotate even during reciprocatory movement thereof.

Another object is to provide means that will prevent oil, dirt or other matter falling from the mechanism into the ingredient being prepared.

Another object is to provide a yieldable connection between the operating shaft and the culinary implement.

Other objects and advantages will hereinafter appear.

Embodiments of the invention and examples of utensils and implements with which the appliance may be used are illustrated in the accompanying drawings.

In the drawings

Fig. 1 is a front elevation of one embodiment of the appliance, wherein the work is brought to the implement on an adjustable utensil support, the door of the mechanism cabinet being shown closed;

Fig. 2 is a side elevation;

Fig. 3 is an enlarged front elevation of the cabinet with the door open to show the interior mechanism which is set to impart reciprocatory motion to an implement;

Fig. 4 is a front elevation of the motion controlling mechanism set to impart rotary motion to an implement;

Fig. 5 is a section on the line 5—5 of Fig. 3;

Fig. 6 is a section on the line 6—6 of Fig. 3;

Fig. 7 is a front elevation and partial section of an alternative form of utensil clamp;

Fig. 8 is a section on the line 8—8 of Fig. 7;

Fig. 9 is a front elevation of the lower end of the appliance showing an auxiliary utensil support;

Fig. 10 is a side elevation of the auxiliary support;

Fig. 11 is a reduced scale side elevation of a modified form of appliance, wherein the implement is brought to the work;

Fig. 12 is a front elevation thereof;

Fig. 13 is a section on the line 13—13 of Fig. 11;

Fig. 14 is an elevation of a utensil support especially adapted for use with an appliance of the type illustrated in Figs. 11, 12 and 13.

Fig. 15 is a perspective of a funnel-shaped utensil;

Fig. 16 is a top plan of the support with the utensil removed;

Fig. 17 is an elevation of a mixing, stirring or beating implement;

Fig. 18 is a section on the line 18—18 of Fig. 17;

Fig. 19 is an elevation of an implement for performing cleaning and polishing operations;

Fig. 20 is an elevation of an implement for performing cleaning and scouring operations;

Fig. 21 is an elevation of an implement for performing pressing and mashing operations;

Fig. 22 is an elevation of an implement for performing chopping operations;

Fig. 23 is a partial top plan of the implement shown in Fig. 22.

Fig. 24 is a front elevation of a coupling means; and Fig. 25 is a section through Fig. 24.

The preferred form of the appliance has a stationary cabinet 1 for housing the operating and control mechanism and an adjustable support 2 for bringing and holding the work to the various implements, such as a beater 3. The mechanism hereinafter described and housed within cabinet 1 may be adjusted to impart either a rotary or a reciprocatory motion to the implements. The support may carry ordinary culinary utensils such as bowls, pots and pans.

The cabinet, which may be formed from suitable material such as sheet or cast metal, is provided with brackets 4 for attaching the same rigidly to a wall or fixture. The cabinet is closed at the front by a hinged door 5 so that the mechanism therein is concealed and protected but is readily accessible for inspection.

The work support is suspended from the bottom of cabinet 1 by four hangers 6, in the form of metal rods. A substantially rectangular platform 7, perforated to receive hangers 6, is held in place by suitable means such as nuts 8, or by riveting the ends of the hangers. Platform 7 carries a split threaded collar 9 for receiving a correspondingly threaded post or pedestal 10. A work carrying table 11 is secured to the upper end of pedestal 10 and the lower end thereof carries a crank 12. The work table may be raised and lowered relative to the cabinet by turning crank 12. A screw and nut 13, which serves to loosen and tighten collar 9 upon pedestal 10, holds the work table firmly in any adjusted position. The upper face of work table 11 may be covered with rubber or other suitable friction material to prevent the rotation of the utensil supported thereon.

The utensil, which is shown in Figs. 1 and 2 as a bowl, may be further steadied by spring actuated clamps. Each clamp has a spring tensioned pulley 14, of any approved type, journaled below platform 7 in suitable brackets 15. A belt or cord 16 is secured to and passes around pulley 14 and has a hook 17 at its free end. Hooks 17 grip the upper edge of a utensil and hold the same firmly down upon the work table.

Figs. 3 to 6 inclusive show the construction of the operating and control mechanism which is located within cabinet 1.

The implements are carried on the lower end of a hollow operating or implement shaft 19. Shaft 19 is rotatably and slidably supported in a bracket 20 which is secured to the rear wall of cabinet 1. A cup 21 tightly surrounds and is carried by shaft 19. Its upper edge is slightly inturned as shown in Fig. 6. The cup is so positioned on shaft 19 that, when the shaft is elevated and connected to the drive shaft, as will be hereinafter explained, its upper edge comes above the lower edge of cabinet 1. This cup serves to catch any oil which may flow down the shaft. Its inturned flange serves to prevent the collected oil from being thrown off when the shaft is in rotation.

The rotation and reciprocation of shaft 19 is derived from an electric motor 22. The speed of motor 22 may be controlled in the usual manner by a rheostat 23. Rheostat 23 has a control handle 24 which extends through a suitable slot 25 in the door of the cabinet so that the motor may be regulated readily from the outside. The rotary motion of the motor is translated into either rotary or reciprocatory motion for implement shaft 19 by mechanism which is also controllable from the outside of the cabinet.

Motor 22 operates a main drive shaft 26 to which it is connected by a suitable flexible coupling 27. Shaft 26 is journaled in a bracket 28 secured to the back wall of cabinet 1. A worm 29 is rigidly fastened to drive shaft 26. The lower end of drive shaft 26 is of reduced diameter to fit within the upper end of operating shaft 19 and is provided with a driving pin 30. Pin 30 is adapted to fit in a bayonet slot 31 adjacent the upper end of shaft 19.

A gear wheel 32 is adapted to be moved into and out of engagement with worm 29. Gear wheel 32 is journaled upon an axle 33 which is carried on a base 34. Base 34 slidably fits between parallel guides 35 which are secured to the rear wall of the cabinet. A control lever 36, which extends through a suitable opening in one end panel of the cabinet, is pivotally secured to base 34 by a bolt 37. The lower edge of lever 36 is provided with two notches 38 and 39. Either notch 38 or 39 may be brought into register with a locking post 40 when control lever 36 is moved in and out of the cabinet, as will hereinafter appear. Suitable ball bearings 41 may be interposed between gear wheel 32 and axle 33. A small roller 42 journaled in a bracket 43 and bearing against the rear face of the rim of gear wheel 32 assists in maintaining the gear wheel in proper mesh with worm 29.

A connecting rod 45 is pivotally connected at one end to gear wheel 32. The other end of connecting rod 45 is pivotally connected to a cross head 46. Cross head or other member 46 is in the form of a sleeve which is journaled about a reduced section of operating shaft 19. Shaft 19 is therefore free to rotate at all times. Cross head 46 has a projecting feather or fin which lies in a longitudinal slot 47 in bracket 20. Ball bearings 48 may be used at both ends of connecting rod 45.

When control lever 36 is moved so that post 40 lies in slot 38, as shown in Fig. 3, gear wheel 32 is in mesh with worm 29. The length of connecting rod 45 is such that when the gear wheel and worm are in mesh the adjacent ends of drive shaft 26 and driven implement shaft 19 can not be brought together.

In this condition the operation of motor 22 drives worm 29 which in turn rotates gear wheel 32. The rotation of gear wheel 32 causes connecting rod 45 to reciprocate implement shaft 19 up and down, imparting a reciprocatory motion to whatever implement is on the bottom thereof. As shaft 19 reciprocates it may be given a rotary motion by hand since the shaft is always free to rotate within the cross head 46, as explained above. The implement can thereby reach all parts of an ingredient container during chopping operation.

Control lever 36 may be moved inwardly, carrying gear wheel 32 out of mesh with worm 29 and permitting implement or operating shaft 19 to be elevated sufficiently to receive the end of drive shaft 26. When post 40 is seated in slot 39, and only then, can the operating and drive shafts be coupled together by the pin and bayonet slot connection. In this condition the rotation of the motor rotates the operating shaft and whatever implement is connected to the bottom end thereof.

In either position of control lever 36, the motion translating mechanism is locked in the proper relation by the cooperation of post 40 and one or the other of slots 38 and 39. The speed of the reciprocatory or rotary motion may be varied by changing the speed of the motor by means of rheostat 23. Control lever 36 is biased to locking position relative to post 40 by a spring 49, one end of which is fastened to lever 36 and the other end is anchored to a rigid member such as bracket 20.

The bottom end of operating shaft 19 is provided with an implement coupling 50. This coupling extends into the hollow end of shaft 19 and is flexibly connected thereto by a small compression spring 51. This spring affords a yielding action so that if the bottom of a utensil is set too close to the cabinet the contact of the utensil will not break the same or cause damage to the operating shaft or translating mechanism. The implements are provided with shanks or stems which may be inserted into the base of coupling 50 and secured thereto by a thumb screw 52.

Figs. 7 and 8 show a modified type of clamp for holding a utensil on work table 11. This clamp comprises a finger 55 which is adapted to contact the inside of a utensil near its rim. Each finger 55 is carried on the end of a screw 56. The other end of screw 56 is provided with a crank 57. Screw 56 threads through a hole in a cross bar 58 carried between a pair of sleeves 59. Sleeves 59 slidably fit upon hangers 6 and may be anchored in any adjusted position by screws 60. The clamping fingers may be raised and lowered to the best position for a given utensil and then, by turning cranks 57, may be caused to firmly engage the opposite sides of the utensil.

Figs. 9 and 10 show an auxiliary support for holding utensils above the main support. This auxiliary support comprises a removable platform 61 extending between the two sets of hangers 6. It is supported at each end on a cross rod 62 which is carried by and between each set of hangers 6. Each cross rod comprises a pin and a sleeve rotatably mounted thereon. Each sleeve carries a screw 63 and a wing nut 64. The opposite ends of platform 61 are slotted to receive screws 63 and are then rigidly clamped in place by nuts 64. Platform 61 has a hole therethrough and may be provided with a removable funnel-shaped sieve 65 through which food ingredients may be forced or pressed and caught by a utensil on the adjustable work table therebelow. This attachment is useful in such operations as the mashing, ricing and straining of food ingredients. Other attachments may be used in place of the sieve when desired.

Figs. 11 to 13 show a modified arrangement wherein the utensil support may be relatively stationary and the implement is moved to the work. In this form, the appliance has a movable cabinet 70 which houses a motor, rheostat and translating mechanism such as previously described. The cabinet is carried in a rectangular framework having parallel side members 71. Side members 71 are grooved to slidably receive the projecting edges of the rear wall of cabinet 70, as most clearly shown in Fig. 13. Thus the cabinet and its contents may be slid up and down in its supporting framework and the implement on the end of operating shaft 19 may be carried from and to the work. Handles 72 may be provided to raise and lower the cabinet. A counterweight may be provided to facilitate the raising and lowering of the cabinet. A cable 73 is secured to the cabinet and passed over a pulley 74. The other end of cable 73 is secured to a suitable counterweight 75 which will balance the weight of the cabinet and its contents and lessen the effort required to move the implements to and from the work.

This type of appliance may be secured to a wall or other suitable support and the utensils may be set upon or secured to an ordinary table, shelf or bracket. The form of utensil clamping fingers shown in Figs. 7 and 8 are well suited to brace the utensils in place upon the table, etc., if such bracing is necessary.

Figs. 14 to 16 show a support for elevating a utensil above an ordinary table. The support has a split utensil retaining ring 77 carried on tripod legs 78. Legs 78 may be weighted and tipped with rubber feet 79. A utensil such as a funnel-shaped sieve 80 may be clamped in ring 77 and locked therein by a suitable ring clasp 81. This sieve may perform the same functions as hereinbefore described in connection with Figs. 9 and 10.

Figs. 17 to 23 illustrate some of the implements which may be connected to the operating or implement shaft to perform various kinds of work. Each implement has a reduced stem or shank 85 which will fit into coupling 50 at the bottom of the operating shaft. When the implement is connected to the coupling it is rotated or reciprocated up and down, depending upon the position of control lever 36.

Figs. 17 and 18 show an implement adapted for mixing, stirring and whipping operations. It has a number of wire loops or vanes 86 at the bottom end of its stem. This implement is particularly suited for rotation and when depressed into a utensil upon the work table will mix or stir the contents thereof. For producing a whipping movement it may be advisable to bend the stem out of a vertical plane as shown in Fig. 1.

Fig. 19 shows a buffing and polishing implement to be actuated by rotation of the operating shaft. The stem of this implement carries a buffing or polishing wheel 87 of appropriate material. When this implement is secured to the operating shaft and rotated thereby it may be used to clean and polish cutlery, silverware, etc.

Fig. 20 shows a cleaning or scouring implement especially adapted to clean and scour pots and pans. Its stem carries a brush 88 of suitable bristles or wires.

Fig. 21 shows an implement especially adapted to perform operations necessitating reciprocatory movement, such as pressing and mashing. The stem carries a head 89 which may be used to crush, press or mash ingredients in the utensil on the work table or to press ingredients through the sieve attachment shown in Figs. 9, 10, and 14–16.

Figs. 22 and 23 show a cutting implement also adapted to perform work through the up-and-down reciprocation of the operating shaft. It has a cutting blade 90 which cooperates with the bottom of a utensil on the work table to cut the ingredients therein.

The appliance and implements herein set forth are well adapted to perform much of the work of preparing food ingredients. Batters, doughs, and other mixtures may be agitated and stirred and vegetables and other ingredients may be cut, mashed or forced through proper strainers and sieves.

I claim:

1. A culinary food-working machine for mashing, mixing, beating, and like operations, comprising in combination, a vertically depending means for receiving and rotating a non-reciprocatory rotary food-working tool, means supporting said first mentioned means for rotation and preventing reciprocation while rotation is effected, a motor, operative connections for rotating said first mentioned means by said motor, reciprocatory means for actuating a different food-working tool, and operative connections for driving said last mentioned means by said motor, said first and second mentioned operative connections embodying elements in common.

2. A culinary food-working machine for mashing, mixing, beating and like operations, comprising in combination, a vertically depending holder adapted to receive a plurality of different food-working tools one at a time, a motor, operative connections between said motor and holder for rotating but not reciprocating said holder, operative connections between said motor and holder for reciprocating but not rotating said holder, and manually operable means for selectively rendering either of said operative connections effective and the other ineffective to actuate said holder.

3. In a food-working machine, a motor driven vertically disposed rotative shaft, a vertically disposed implement actuating member directly rotative by said motor driven shaft, and mechanism operable by said motor driven shaft to effect the vertical reciprocation of said implement actuating member while preventing the rotative movement of said implement actuating member by said motor driven shaft.

In witness whereof, I have hereunto subscribed my name.

WILLIAM F. HACKETT.